United States Patent [19]

Langworthy

[11] 4,257,695
[45] Mar. 24, 1981

[54] FILM PROJECTION GATE

[75] Inventor: Harold F. Langworthy, Webster, N.Y.

[73] Assignee: Eastman Kodak Company, Rochester, N.Y.

[21] Appl. No.: 21,757

[22] Filed: Mar. 19, 1979

[51] Int. Cl.³ .................. G03B 1/52; G03B 21/16
[52] U.S. Cl. .................. 353/95; 352/147; 353/61
[58] Field of Search .................. 353/60, 61, 95; 352/146, 147

[56] References Cited

U.S. PATENT DOCUMENTS

| | | | |
|---|---|---|---|
| 1,408,203 | 2/1922 | Jenkins | 352/146 |
| 1,684,304 | 9/1928 | Berg | 352/146 |
| 2,315,914 | 4/1943 | Wengel | 353/61 |
| 3,179,007 | 4/1965 | Benford | 353/53 |

FOREIGN PATENT DOCUMENTS

| | | | |
|---|---|---|---|
| 95787 | 1/1924 | Austria | 352/146 |
| 97271 | 6/1924 | Austria | 353/69 |
| 344667 | 11/1920 | Fed. Rep. of Germany | 352/146 |
| 1237356 | 3/1967 | Fed. Rep. of Germany | . |

Primary Examiner—Steven L. Stephan
Attorney, Agent, or Firm—John D. Husser

[57] ABSTRACT

A film gate for image projection apparatus provides improved structure for directing cooling air across the surfaces of supported film. The outlets of the cooling air conduits are located adjacent edges of supported film and configured and oriented to create Coanda effect attachment of their issuing air streams to the film surfaces.

8 Claims, 5 Drawing Figures

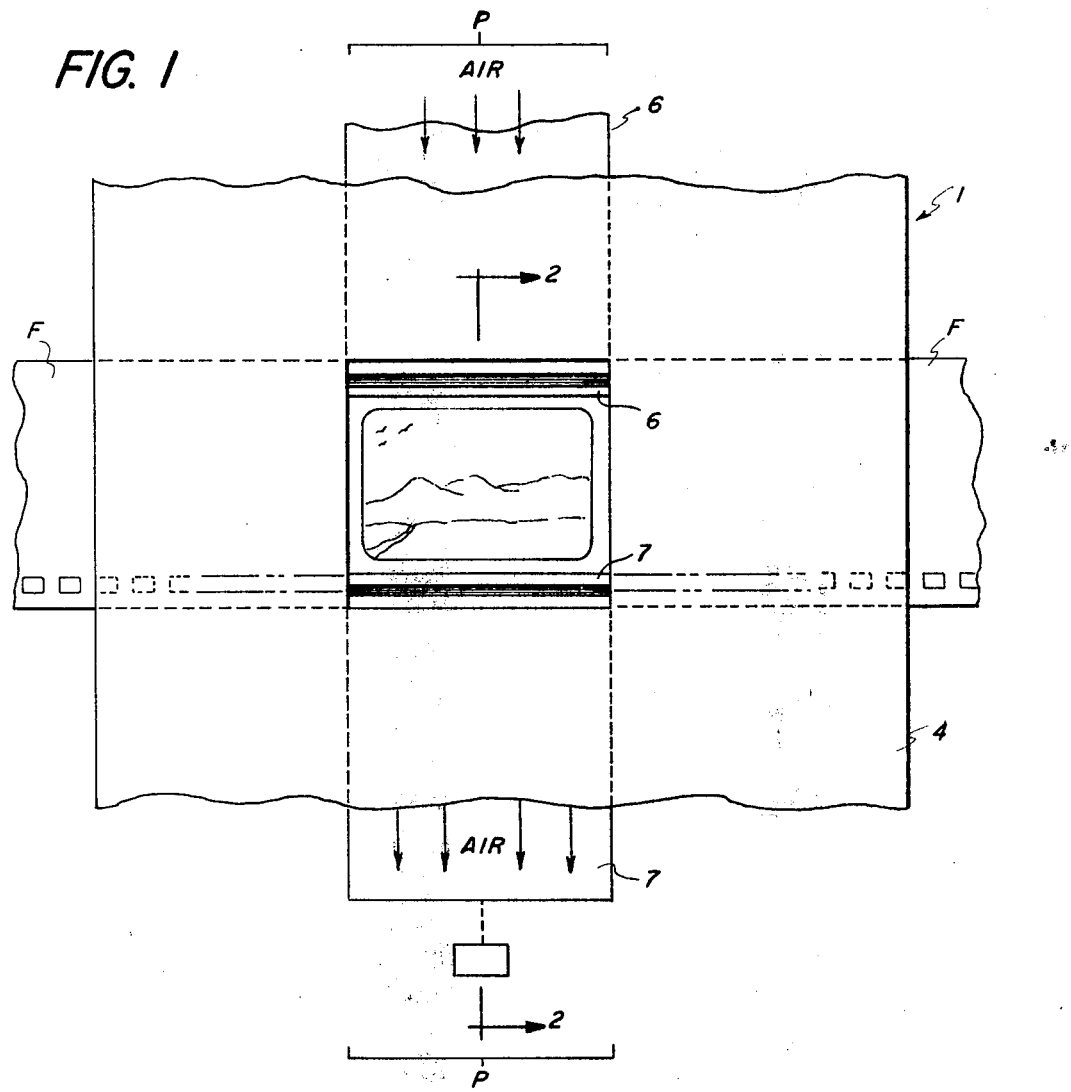
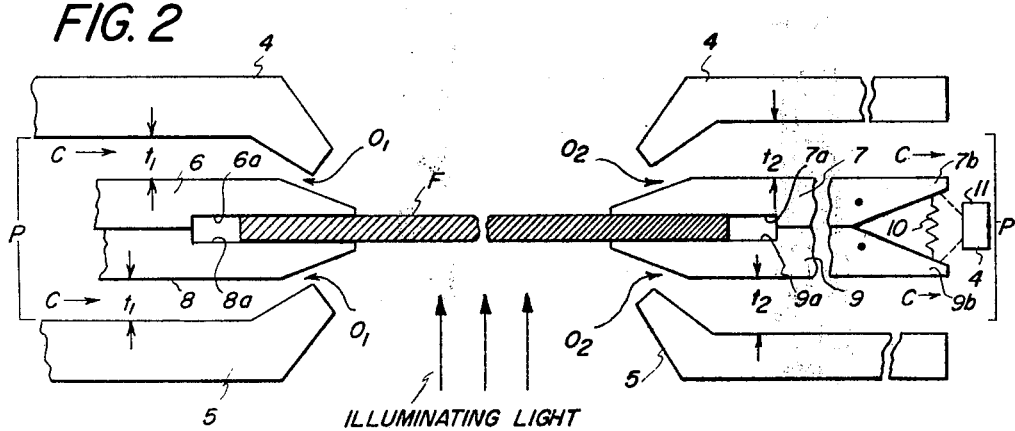

FILM PROJECTION GATE

BACKGROUND OF THE INVENTION

1. Field of the Invention

The present invention relates to film gates for image projectors and more particularly to such projector film gates having an improved film-cooling structure.

2. Description of the Prior Art

In apparatus which project film images, e.g., slide or motion picture projectors, microfilm readers or projection printers, a problem is usually presented because the high intensity radiation from the projection light source heats the film and projection gate structure. This can cause film buckling, which displaces the film image from the projection plane, and in severe cases can cause damgage to the film or film image.

It is a generally well known technique to cool film at projection gates by directing air toward it. In one approach of this type, high velocity air nozzles, which are spaced out of the optical projection paths extending to and from the projection zone, direct streams of air toward the film. However, as the amount of heat which must be transferred from the projection zone increases, it becomes very difficult to design a nozzle system that will provide adequate cooling without nozzle portions optically interfering in the image projection path. A related problem is that air directing structure around the edges of the projection zone decreases the space available for properly supporting the film in the projection plane.

An alternative cooling approach is to utilize air directing structure that is light-transparent and thus can be located in the optical projection path, close to the film plane. Although such structures transmit light, they absorb other wavelengths of the radiation emitted by the projection source and thereby add to the heat load in the projection zone. Further, such light-transparent structures must be reasonably close to the film plane to achieve reasonable cooling efficiency; and, in such closely-spaced location, the dirt or scratches which accumulate on the light-transparent structures are within the depth of focus of the projection lens and cause degradation of the projected image.

SUMMARY OF THE INVENTION

The present invention pertains to improved film gate structure for image projection apparatus which avoids the difficulties outlined above. Thus, it is an object of the present invention to provide for such apparatus film gate structure which is simple in design and non-interfering with the projection path yet effectively supports and efficiently cools film under high heat load conditions.

The above and other objects and advantages are facilitated according to the present invention by the provision of a film gate having means for supporting the film in a projection zone, fluid conduit means for delivering cooling air to a location(s) proximate an edge portion(s) of the projection zone and orifice means for directing the air from that location(s) into Coanda effect attachment with the surface of the supported film.

BRIEF DESCRIPTION OF THE DRAWINGS

In the subsequent description of preferred embodiments of the present invention, reference is made to the attached drawings which form a part hereof and in which:

FIG. 1 is a top view of the film gate portion of projection apparatus incorporating one embodiment of the present invention;

FIG. 2 is a view of the film gate structure shown in FIG. 1 taken along section line 2—2;

DETAILED DESCRIPTION OF THE PREFERRED EMBODIMENTS

Figure 3:
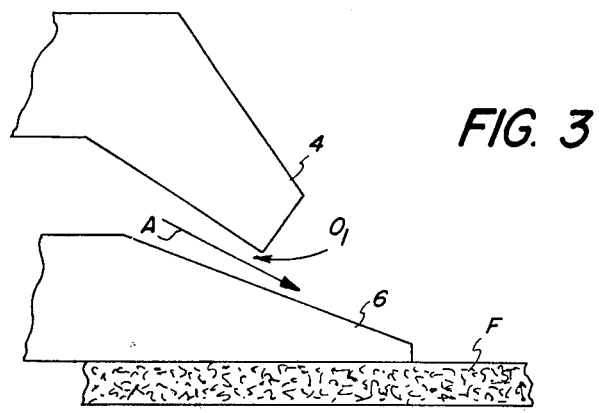
FIG. 3 is an enlarged view of a portion of FIG. 2.

Referring to FIGS. 1 and 2 it can be seen that the film gate 1 of the projection apparatus comprises apertured upper and lower mask plates 4 and 5 respectively, which are mounted within the projection apparatus housing by conventional structure, not shown. The apertures of plates 4 and 5 are centered on the axis of projection and define the general peripheral boundaries of the planar projection zone.

A strip of film F, containing images to be projected, is fed by transport means, not shown, to position successive images in the projection zone. The inner surfaces of plates 4 and 5 can be configured to support and guide the film along a transport path extending to and from the projection zone. The plates 4 and 5 also are configured to provide therebetween an air passage that leads to an edge of the projection zone. As shown in FIG. 1, the air passage P defined by plates 4 and 5 can conveniently be generally orthogonal to the film transport path.

Mounted within the air passages are film support members 6, 7, 8, 9 which are shown most clearly in FIG. 2. These film support members can each comprise a clamping recess 6a, 7a, 8a, and 9a formed on their inner surfaces for receiving a support edge of the film (i.e., a portion not containing image information). FIG. 2 also illustrates that the opposite ends of the clamping members 7b and 9b can comprise a beveled cam surface. Those film support members each are pivotally mounted and can be urged to the film clamping position shown in FIG. 2 by appropriate spring means, illustrated schematically at 10. Appropriate electromagnetic transducer means e.g., a solenoid 11, is provided to compress the ends against the spring means, thus spreading the opposite ends of the film support members to allow film to be advanced through the projection zone. The ends of members 6 and 8 have a similar configuration, not shown.

As shown most clearly in FIG. 2, the inner surfaces of plates 4 and 5 and the outer surfaces of film support plates 6, 7, 8 and 9 cooperatively form air inlet and outlet conduits C opening along opposite edges of each surface of film which is supported in the projection zone. More specifically, such surfaces of members 4 and 6 define an inlet conduit of thickness $t_1$ which delivers cooling air to a location along one edge of the film and such surfaces of members 4 and 7 define an outlet conduit of thickness $t_2$ which has an entrance along the opposite edge of the film. The surfaces of members 5 and 8 and members 5 and 9 form similar air inlet and egress conduits and the orifices of such conduits are denoted $O_1$ and $O_2$.

In accordance with the present invention, the ends of the members 4 and 6 and 5 and 8, which form the upper and lower orifices $O_1$, are predeterminedly configured and located to cause Coanda effect flow of cooling air across the upper and lower major surfaces of film in the projection zone. In general, Coanda effect flow results when a fluid flow passes from a region in which the constraining walls are substantially parallel, to a region where the walls diverge significantly.

This phenomenon can be understood more clearly by referring to FIG. 3, which is an enlarged view of the orifice-defining structure shown in FIG. 2. As air A leaves the upper orifice $O_1$, moving air molecules collide with stationary air molecules in the region immediately outside the orifice. These collisions impart momentum to the stationary molecules and entrain them in the air flow. Since the entrained molecules move with the exiting fluid stream, a zone of decreased pressure evolves, which air molecules from both sides of the stream move to equalize. However, pressure equalization is more readily effected in the region above the stream than the region below the stream, because no wall exists in that upper region. The region below the stream is therefore of lesser pressure and this causes the stream to attach to the surface of member 6. As shown, member 6 is tapered from the orifice to the film to direct the attached air stream into attachment with the upper surface of film. Air flow thus proceeds across the surface in close relation thereto. The intimate relation of moving air molecules to the film surface facilitates excellent heat transfer from the film to the air and very effective film cooling is achieved.

Referring back to FIG. 2, it can be seen that orifices $O_2$ are of greater dimension than orifices $O_1$ and that the thickness $t_2$ of the air outlet conduits is larger than thickness $t_1$ of the air supply conduit. This arrangement has been found desirable to maintain stable air flow because the entrainment of air molecules increases the volume of air in the stream and decreases stream velocity somewhat.

Having now described the structural features of one preferred embodiment of the present invention, the mode of operation will be readily understood. To initiate an image projection sequence, solenoids 11 are actuated to open members 6 and 8 and 7 and 9 respectively. Film F is advanced to position an image portion to be projected in the exposure plane. During energization of the projection-illuminating source (not shown), air flow is directed to orifices $O_1$ from a pressurized source (not shown), through the inlet conduits defined by members 4 and 6 and 5 and 8. This flow moves into Coanda effect attachment with the upper and lower surface of film at the projection zone by virtue of the air outlet configuration described above and thus effectively cools the film. The cooling air then enters orifices $O_2$ and is discharged from the projection apparatus by the passages formed by members 4 and 7 and 5 and 9.

A film gate substantially the same as that shown in FIGS. 1 and 2 was constructed of dimensions suitable for the projection printing from negatives of 110 size still camera film. The projection apertures defined by plates 4 and 5 were approximately 0.5 by 0.65 inches and the air entrance orifices $O_1$ were approximately 0.010 to 0.015 inches in thickness. With an air pressure source in the range of about 3.5 to 10.1 lbs/in$^2$, the film could be maintained in the gate without damage at the varying levels of illumination suitable for print exposure with such film. Such illumination could be maintained well beyond the necessary exposure period; however, if the air was turned off, the film smoked and bubbled within a few seconds. It was observed that during application of air pressure, the air motion near the projection apertures (and either above or below the film) is directed toward the film, not away from the film as might be expected in a gate not using this cooling means. It was also found that blocking the projection apertures with glass plates, so as to form closed channels for the air flow, drastically reduced the effectiveness of the air cooling and resulted in film buckling and film damage. It was also found that if large air jets, necessarily spaced from the projection apertures because of the presence of optical components on both sides of the film, were substituted for the configuration described above, film cooling was generally ineffective.

Figure 4:
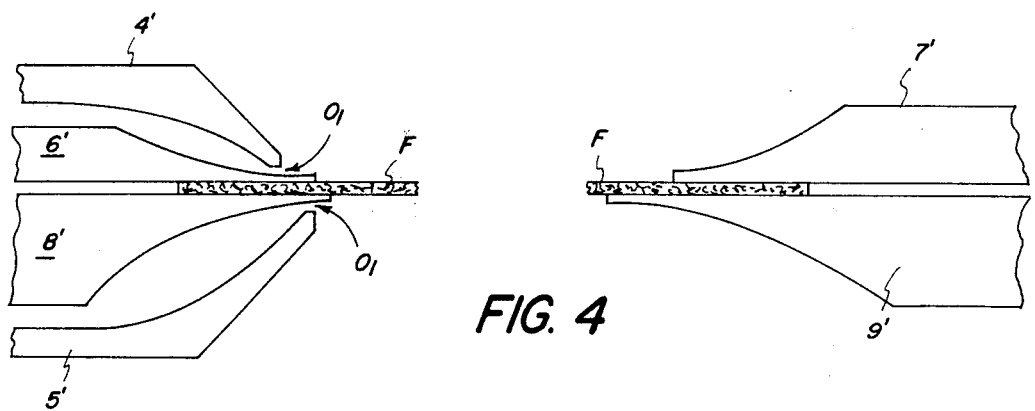
FIGS. 4 and 5 are sectional views similar to FIG. 2, but of alternative embodiments of film gate structure according to the present invention.
Figure 5:
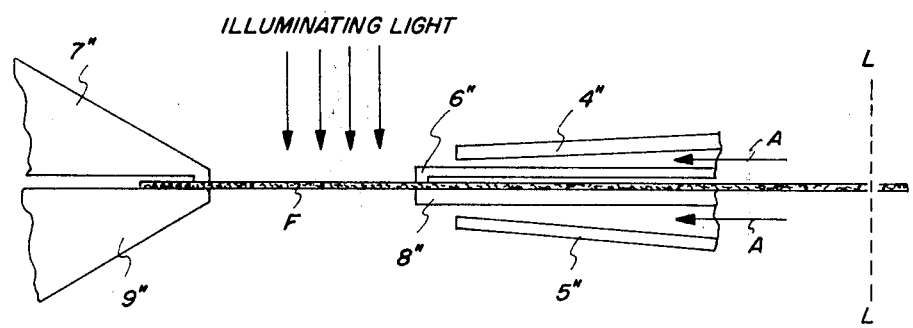

A critical aspect for practicing the invention is that the air inlet passage and orifice configuration create effective Coanda attachment of the cooling air stream to the film surface which is being projected. It will be appreciated that this can be implemented by various structures different from those described above. For example, FIGS. 4 and 5 show alternative preferred embodiments of film gates according to the present invention in which corresponding parts bear the same numerical designation as in FIGS. 1 and 2. It will be noted that in each of the FIG. 4 and 5 embodiments the egress openings are defined only by members 7' and 9' and 7" and 9". FIG. 5 is also of interest as showing a film gate embodiment useful with a disc-like array of images, which can be rotated about axis L—L when retaining members 7"-9" and 6"-8" are moved apart.

Also it will be appreciated that flow of air across the upper and lower surfaces need not be in the same direction. Thus in certain applications the upper and lower air streams could be opposite, orthogonal or otherwise angularly disposed. Also in certain applications flow across only one surface might provide sufficient cooling.

Of course the film to be cooled need not be in strip or disc form as shown but could be in other forms, e.g., sheet form, such as microfiche or slide form.

The invention has been described in detail with particular reference to certain preferred embodiments thereof, but it will be understood that variations and modifications can be effected within the spirit and scope of the invention.

I claim:

1. In projection apparatus of the type having a projection zone at which an image-bearing film is subjected to illuminating radiation for image projection, an improved projection gate comprising
   (a) means for supporting such film in said projection zone; and
   (b) means defining a first fluid conduit for directing cooling fluid from a source location, spaced from said projection zone, to a discharge location extending along an edge portion of said projection zone, said conduit defining means including at such discharge location a first wall contiguous film supported at said projection zone and a second wall spaced from said first wall so as to define a fluid discharge orifice, said first wall extending toward the film beyond the terminus of said second wall and being configured so that fluid egressing said orifice exhibits Coanda effect attachment to a major surface of the film at a location substantially at, or upstream from, said edge portion of said projection zone.

2. The invention defined in claim 1 further including means defining a second fluid conduit for directing fluid away from a location along the edge of said projection zone which is opposite said discharge orifice, said second fluid conduit defining means having an ingress orifice larger than said discharge orifice.

3. The invention defined in claim 2 wherein a portion of the wall means of each of said fluid conduit defining means is constructed and located to cooperate in the support of film in said projection zone.

4. The invention defined in claim 1 further including second conduit means, constructed and located relative to an edge of said projection zone like said first conduit means but located on the opposite side of such film from said first conduit means, for directing fluid across the major film surface opposite said first surface.

5. In projection printing apparatus of the type having a projection zone at which an image bearing film is subjected to illuminating radiation for projection of its image and which comprises means for supporting such film in said projection zone and means for supplying cooling air to said projection zone, the improvement wherein: (1) said supporting means comprises at least one member adapted to engage an edge portion of such film image for accurately positioning it in said zone without intervening within the image projection path, (2) said supplying means includes discharge orifice means formed by a wall member that is spaced from a surface of said engaging member and terminates upstream from the terminus of said engaging member and (3) the portion of the engaging member which extends downstream of said wall member is configured so that said engaging member directs cooling air from said supply, by Coanda effect attachement, into intimate heat exchange relation with the supported film at a location substantially adjacent its terminus.

6. In projection printing apparatus of the type having a projection zone at which an image bearing film is subjected to illuminating radiation for projection of its image and which comprises means for supporting such film in said projection zone and means for supplying cooling air to said projection zone, the improvement wherein: (1) said supporting means comprises at least one member adapted to engage an edge portion of such film image for accurately positioning it in said zone without intervening within the image projection path, (2) said supplying means includes discharge orifice means formed by a wall member that is spaced from a surface of said engaging member and terminates upstream from the terminus of said engaging member and (3) said surface of said engaging member is tapered toward the supported film so that said engaging member directs cooling air from said supply, by Coanda effect attachment, into intimate heat exchange relation with the supported film.

7. In projection apparatus of the type having a projection zone at which an image-bearing film is subjected to illuminating radiation for image projection, an improved projection gate comprising
 (a) means for supporting such film in said projection zone; and
 (b) means defining a first fluid conduit for directing cooling fluid from a source location, spaced from said projection zone, to a discharge location extending along an edge portion of said projection zone, said conduit defining means including at such discharge location a first wall contiguous film supported at said projection zone and a second wall spaced from said first wall so as to define a fluid discharge orifice, said first wall extending toward the film beyond the terminus of said second wall and being tapered so as to create smooth flow transition therefrom onto a major surface of supported film;
whereby fluid egressing said orifice exhibits Coanda effect attachment to such major surface of the film.

8. In projection apparatus of the type having a projection zone at which an image-bearing film is subjected to illuminting radiation for image projection, an improved projection gate comprising
 (a) means for supporting such film in said projection zone;
 (b) means defining a first fluid conduit for directing cooling fluid from a source location, spaced from said projection zone, to a discharge location extending along an edge portion of said projection zone, said conduit defining means including at such discharge location a first wall contiguous film supported at said projection zone and a second wall spaced from said first wall so as to define a fluid discharge orifice, said first wall extending toward the film beyond the terminus of said second wall, whereby fluid egressing said orifice exhibits Coanda effect attachment to a major surface of the film;
 (c) means defining a second fluid conduit for directing fluid away from a location along the edge of said projection zone which is opposite said discharge orifice, said second fluid conduit defining means having an ingress orifice larger than said discharge orifice; and
 (d) third and fourth fluid conduit defining means respectively configured like said first and second conduit defining means but located adjacent the opposite face of the positioned film.

* * * * *